Figure 1:
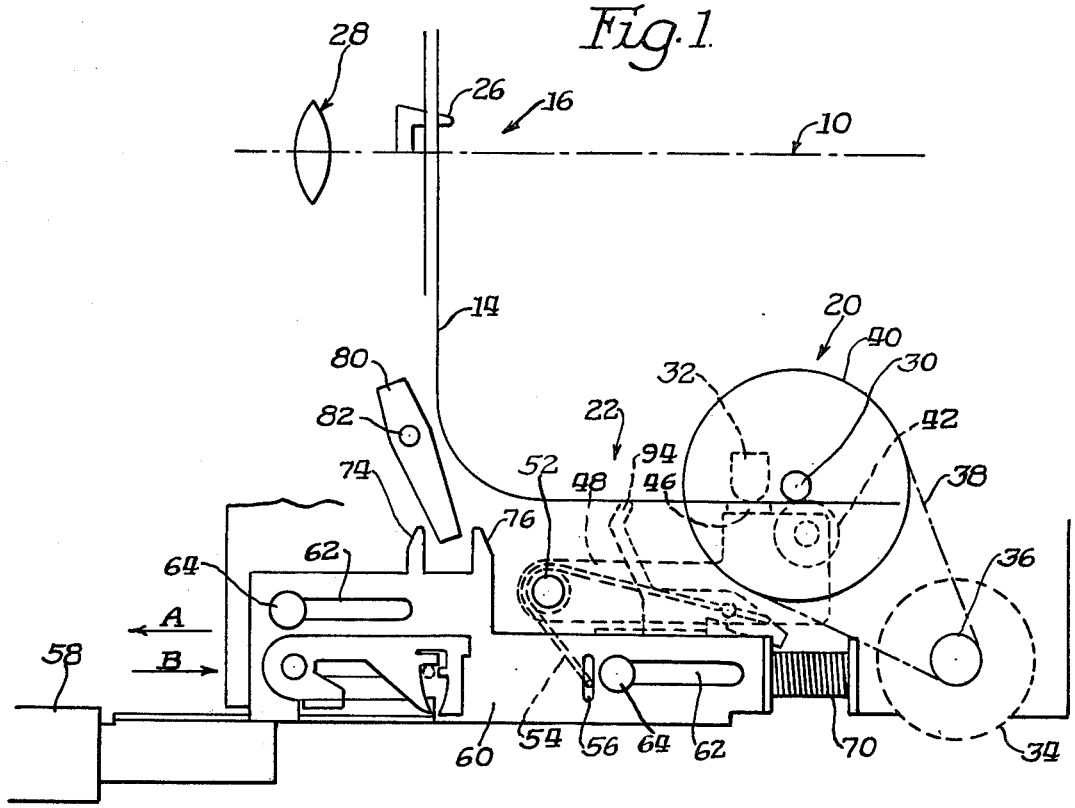

United States Patent [19]

Ishibashi

[11] 4,052,125

[45] Oct. 4, 1977

[54] STARTING AND STOPPING DEVICE FOR SOUND MOTION PICTURE CAMERA

[75] Inventor: Takao Ishibashi, Higashiyamato, Japan

[73] Assignee: Nihon Beru-Haueru Kabushiki Kaisha (Bell & Howell, Japan, Ltd.), Higashimurayama, Japan

[21] Appl. No.: 678,275

[22] Filed: Apr. 19, 1976

Related U.S. Application Data

[63] Continuation of Ser. No. 488,870, July 15, 1974.

[30] Foreign Application Priority Data

July 31, 1973    Japan ................................ 48-90966

[51] Int. Cl.² ............................................ G03B 31/02
[52] U.S. Cl. ........................................ 352/29; 352/27; 352/30; 360/3
[58] Field of Search ....................... 352/26, 27, 29, 30, 352/166; 360/3

[56] References Cited

U.S. PATENT DOCUMENTS

| 3,405,945 | 10/1968 | Braeth | 352/29 |
| 3,880,504 | 4/1975 | Marvin | 352/29 |

Primary Examiner—Russell E. Adams
Attorney, Agent, or Firm—John E. Peele, Jr.; Roger M. Fitz-Gerald; Aaron Passman

[57] ABSTRACT

A motion picture camera for simultaneous recording of picture and sound is provided with a starting and stopping device for controlling film transport mechanisms and displacing same into and out of operative orientation with the film as the camera is actuated and deactuated wherein the size of the film loop is maintained substantially constant before or after and during camera operation.

1 Claim, 2 Drawing Figures

STARTING AND STOPPING DEVICE FOR SOUND MOTION PICTURE CAMERA

This is a continuation of application Ser. No. 488,870, filed July 15, 1974.

The invention relates to a motion picture camera, and particularly to a starting and stopping mechanism for a camera having a sound system by which audio is recorded simultaneously with the exposure of a picture.

Motion picture cameras have been provided with systems for recording sound at the same time as a series of pictures are exposed. Until recently, most of the sound systems for cameras available for the home user required independent tape recorders coupled electrically or electro-mechanically to the camera. However, a "single-system" sound camera equipment and film supplies now have been made available by which a camera is provided with an internal audio recording capability. These units enable recording sound simultaneously with pictures on a film having an audio recording capability as well as picture recording capability.

In one class of single system sound motion picture cameras, a mechanism is provided for controlling the rate of operation of the film transporting intermittent mechanism at the exposure station of the camera. The rate control is accomplished by detecting the change of the size of the film loop between the intermittent mechanism and the mechanism for moving film at a constant speed through the sound station, which mechanisms are driven respectively by independent motors. The system has an advantage of being small in size and high in performance, although it has a deficiency in that portions of the film are not exposed properly because the size of the film loop often is changed inadvertently as the camera mechanism is started and stopped. The deficiency is seen to occur since the attempts of the system to correct for transport rate changes causes the film to not be transported through the exposure station at the usual rate.

To overcome the film transport error deficiency of existing single-system sound motion picture cameras, a device is provided to control energization of the intermittent and sound station drive systems at predetermined intervals relative to starting and stopping the camera. The device controls the motor control circuit responsive to the relative positioning of a pinch roller and a capstan, which when in substantial contact, one with the other transport the film through the sound station. At the start of a camera operation, the control circuit is completed after the pinch roller is in contact with the capstan and is ready to move film. At the stop of the camera operation, the control circuit is opened after the punch roller and capstan are separated. Since the motors are stopped following separation, the film loop is maintained substantially constant. Since the control circuit is not significantly altered by abrupt changes in the film loop, the picture and sound are maintained in synchronization and exposure film is maintained substantially consistent.

An object of the invention is to provide a starting and stopping device for controlling film transporting mechanisms to a single system sound camera to maintain film loop size between an exposure station and a sound station of the camera.

Another object of the invention is to provide a film transport mechanism and control system to isolate possible abrupt changes in the film loop caused by the transport mechanism from the control system.

Yet another object is to automatically control engagement and separation of sound station components respectively before and after energization and de-energization of film transport mechanisms.

The above and other objects and advantages of the invention will become apparent from the detailed description which follows when taken in conjunction with the accompanying drawings in which like numbers refer to like parts.

Figure 2:
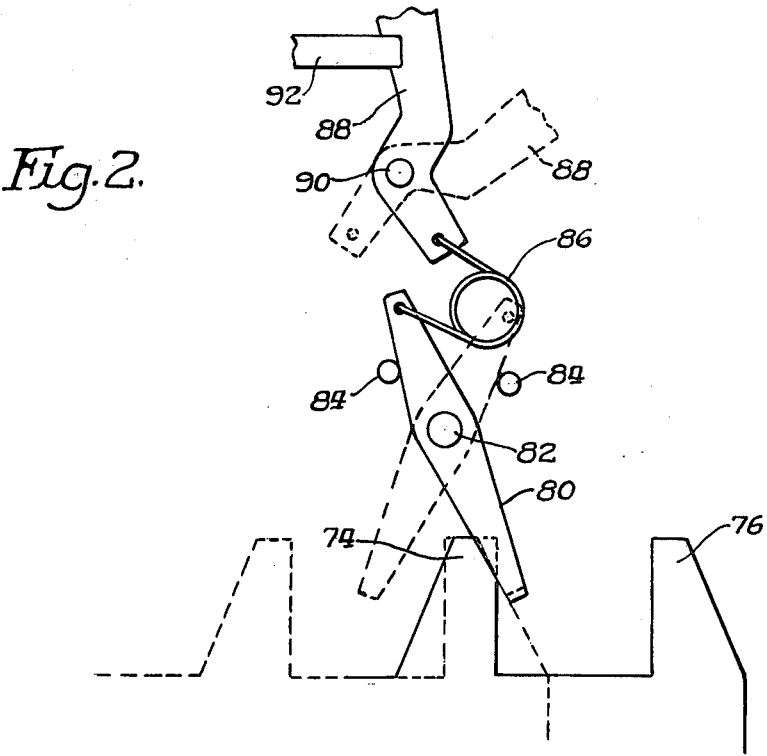

In the Figures:

FIG. 1 is a schematic showing of portions of a sound motion picture camera with parts cut away and parts removed for clarity; and FIG. 2 is an enlarged fragmentary schematic detail view illustrating components of the control device.

Referring to the drawings, a film transporting arrangement according to the invention is shown in a portion of a sound motion picture camera identified generally as 10. The camera is provided with a not shown film chamber in which can be inserted a film 14 having thereon a not shown audio track. Through a portion of the film path, the film is accessible at an exposure station 16 and an audio or sound recording station 20. Intermediate these stations, a film loop 22 is formed and maintained to enable the film to be intermittently transported through the exposure station and continuously transported at a constant rate through the sound station. Ideally, during camera operation, the film loop is maintained constant within small tolerances as the shuttle, shown schematically at 26, stops the film for exposure by light rays through the objective lens 28 before transporting the film toward the sound station. Simultaneously, the film is being moved continuously through the sound station at a constant rate established for recording of sound on the film of the format being used. Hence, periodic corrections are required for the rate of film movement through the exposure station 16 to maintain the film loop with enough film, but not too much film, for smooth feeding of the film through the sound station 20.

The rate of operation of the shuttle mechanism 26 at the exposure station 16 is controlled electrically or mechanically by not shown means which may be a variable speed motor.

For powering a capstan 30 for driving a film past a transducer, shown in the sound station 20 as a magnetic recording head 32, a motor 34 is shown coupled to the capstan through a pulley 36, a belt 38 and a flywheel 40. The film 14 is caused to be transported when a pinch or pressure roller 42 is moved into engagement with the surface of the film to hold the film against the capstan. The pinch roller and a transducer backing pad 46 are supported on an arm 48 pivoted for arcuate movement about an axle 52. A resilient member shown as a substantially U-shaped spring 54, is coiled about the pivot axis 52 with one leg fixed to the pinch roller support arm 48 and the other leg fixed in a slot 56 formed in a portion of the camera actuator mechanism.

The camera actuator control mechanism includes a start button 58 provided for actuating and de-actuating film transporting and other mechanisms of the camera. In this embodiment, the start button 58 is supported on a slide plate or slidable arm 60 in which are formed elongated slots 62 to guide the movement of the plate relative to pins 64 fixed in the chassis 66 of the camera. The slide plate 60 is slidable in both of the directions shown by arrows A and B, and is continuously biased toward an inoperative condition, by a spring 70, the direction A.

Formed integrally with the slide plate 60 so as to be moved therewith are a front trigger 74 and a rear trigger 76 which cooperate with a pivotable start lever 80 for transmitting to camera mechanisms operation commands of the start button. The relatively rigid elongated trigger members 74, 76 are arranged to both sides of the tip of the start lever so that these trigger members engage the start lever after movement of the slide plate has started. By this lost-motion connection, the trigger member 74 engages the lever during movement of the slide plate in direction B and the trigger member 76 engages the opposite side of the start lever 80 during movement in the opposite direction (A). The start lever is mounted for rotation about a pivot 82 between a pair of limit stop pins 84 fixed on the chassis as shown in FIG. 2. An overcenter spring 86 couples the start lever 80 to a contact plate 88 which is rotatable about a pivot 90 to cause substantially simultaneous movement of both components when the start lever is driven over center by one of the trigger members. As the start lever 80 is rotated counterclockwise to the solid line position of FIG. 2, the spring 90 rotates the contact plate 88 into engagement with a fixed contact 92 of the circuit by which the motors are energized. Similarly, as the start lever 80 is rotated clockwise to the dashed line position, the contact plate 88 is disengaged and separated from the contact 92 thereby de-energizing the motors. Hence, the circuit is controlled responsive to but slightly following movement of the slide plate in the camera operative and camera inoperative directions.

A loop sensor 94 is arranged for movement about a pivot 96 for continuous engagement of the film loop under influence of a not shown spring. As the size of the film loop changes, the loop sensor 94 modifies the rate of operation of the drive of shuttle 26 as required to keep the film loop 22 at a nearly constant predetermined size. That is, if the loop becomes smaller, the shuttle drive rate is increased, but if the loop becomes larger, the drive rate is decreased.

Operations of the camera mechanisms are initiated when the start button 58 is depressed against the force of the spring 70 in the direction B. By the interconnection of the slide plate 60 and the support arm 48 through the coiled spring 54, the shift of the slide plate, rotates the support arm to raise the pinch roller 42 into position to press the film 14 against the capstan 30.

When the slide plate 60 is moved further in the camera inoperative direction, the tip of the start lever 80 is pushed by the front trigger member 74 of the slide plate. When the start lever is pivoted over the center line from the dashed line position toward the solid line position, the overcenter spring 86 completes the pivoting action and drives the contact plate into 88 engagement with the contact 92.

As above explained, the pinch roller 42 and pad 46 are first moved into operative position upon depressing the start button 58 to start camera operation. Thereafter the electric motor control circuit is completed to initiate film transport. At the end of a camera operation sequence, stopping of the camera is initiated by release of the start button 58. Upon release of that button, spring 70 urges the button and slide plate in the camera operative direction (A). Movement of slide plate rotates spring 54 in the counter-clockwise direction causing the pinch roller 42 to be withdrawn from the capstan 30.

Further movement of the slide plate causes the rear trigger 76 to engage and pivot the start lever 80. As the start lever pivots over the center line, the overcenter spring 86 is actuated to complete the rotation of the start lever and drive the contact plate 88 out of engagement with the control circuit contact 92. Hence, the pinch roller 42 is seen to be separated from the capstan before the drive motor is stopped by opening of the control circuit.

Since the film is not engaged at the sound station at either the start or stop of the film transport mechanism, the size of the film loop is not altered by differential rates of operation of the transport mechanisms. Hence, the film loop between the exposure and sound stations is maintained at the desired size while the camera is operative and inoperative.

While this invention has been particularly shown and described with the preferred embodiment, it will be understood that various changes and modifications may be made without departing from the spirit and scope of the invention.

What is claimed is:

1. In a motion picture camera having an exposure station and a sound station through which a sound film is transported for simultaneous recording thereon of pictures at the exposure station and sound at the sound station; a film loop being defined by the film in a path between the stations; a film transport mechanism for intermittently moving film through said exposure station and a film transport mechanism displaceable into and out of film engagement for constantly moving the film through said sound station by respective motor means; and a starting and stopping device for controlling said film transport mechanisms comprising:

camera actuating means movable between a first position for camera operation and a second position for camera inoperation;

a pivotable start lever displaceable from a first orientation to a second orientation responsive to displacement of said camera actuating means from said first position to said second position;

slide plate means driven by said movable camera actuating means and including means for engaging and positioning said start lever from one of said orientations to the other of said orientations after initial movement of said camera actuating means from a corresponding one of said positions toward the other of said positions;

biasing means coupled to an end of said start lever opposite said slide plate means engaged end for causing complete movement of said start lever upon at least partial movement of said camera actuating means from one position toward another following initial displacement by said slide plate means; and means connected to said camera actuating means for causing said displaceable film transport mechanism to be moved into film engagement prior to complete actuation of said start lever and actuation of said intermittent film transport mechanism and to be moved from film engagement prior to de-actuation of said start lever and said latter film transport mechanism;

whereby the film loop between the exposure and sound stations is maintained substantially constant upon starting and stopping of the camera.

* * * * *